United States Patent
Sakai et al.

(10) Patent No.: US 12,508,669 B2
(45) Date of Patent: Dec. 30, 2025

(54) METHOD FOR WELDING COPPER-INCLUDING MEMBERS, AND METHOD FOR MANUFACTURING ELECTRICAL ROTATING MACHINE

(71) Applicant: KABUSHIKI KAISHA TOSHIBA, Kawasaki (JP)

(72) Inventors: Tetsuo Sakai, Taito (JP); Masakazu Kikawada, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 844 days.

(21) Appl. No.: 17/406,211

(22) Filed: Aug. 19, 2021

(65) Prior Publication Data
US 2021/0379698 A1    Dec. 9, 2021

Related U.S. Application Data

(63) Continuation of application No. PCT/JP2019/006721, filed on Feb. 22, 2019.

(51) Int. Cl.
*B23K 26/21* (2014.01)
*B23K 26/03* (2006.01)
(Continued)

(52) U.S. Cl.
CPC .............. *B23K 26/21* (2015.10); *B23K 26/03* (2013.01); *B23K 26/082* (2015.10); *H02K 15/04* (2013.01);
(Continued)

(58) Field of Classification Search
CPC ...... B23K 26/21; B23K 26/082; B23K 26/03; B23K 2101/38; H02K 15/04; H02K 15/062
(Continued)

(56) References Cited

U.S. PATENT DOCUMENTS 6,198,071 B1 * 3/2001 Kitsunai ................ B23K 31/12
                                                        219/130.01
9,667,125 B2 * 5/2017 Nishiyama ............. B23K 26/21
(Continued)

FOREIGN PATENT DOCUMENTS

| CN | 102528225 A | 7/2012 |
| CN | 106029291 A | 10/2016 |

(Continued)

OTHER PUBLICATIONS

Machine Translation of JP2019181506A (Year: 2025).*
International Search Report issued May 21, 2019 in PCT/JP2019/006721, filed on Feb. 22, 2019, 1 page.

*Primary Examiner* — Edward F Landrum
*Assistant Examiner* — Thomas J Ward
(74) *Attorney, Agent, or Firm* — Oblon, McClelland, Maier & Neustadt, L.L.P.

(57) ABSTRACT

A method for welding copper-including members includes laser-welding a first member that includes copper, and a second member that includes copper and is located adjacent to the first member. A welding surface of the first member and a welding surface of the second member are melted by moving an irradiation position of a laser to turn in a spiral shape while approaching a center of the spiral when irradiating the laser on the welding surface of the first member and the welding surface of the second member.

12 Claims, 12 Drawing Sheets

(51) Int. Cl.
*B23K 26/082* (2014.01)
*B23K 101/38* (2006.01)
*B23K 103/12* (2006.01)
*H02K 15/04* (2025.01)
*H02K 15/062* (2025.01)

(52) U.S. Cl.
CPC ........ *H02K 15/062* (2013.01); *B23K 2101/38* (2018.08); *B23K 2103/12* (2018.08)

(58) Field of Classification Search
USPC .................................................... 219/121.64
See application file for complete search history.

(56) References Cited

U.S. PATENT DOCUMENTS

| | | | |
|---|---|---|---|
| 11,471,975 B1 * | 10/2022 | N?rhi | ................. B23K 26/0608 |
| 2012/0079713 A1 | 4/2012 | Hosokawa et al. | |
| 2014/0338183 A1 | 11/2014 | Nishiyama et al. | |
| 2018/0036836 A1 | 2/2018 | Nakamura | |
| 2019/0013704 A1 | 1/2019 | Pydin | |

FOREIGN PATENT DOCUMENTS

| | | | | |
|---|---|---|---|---|
| EP | 3 517 243 A1 | 7/2019 | | |
| JP | 2009-154194 A | 7/2009 | | |
| JP | 2011-189407 A | 9/2011 | | |
| JP | 2012-79476 A | 4/2012 | | |
| JP | 4937798 B2 | 5/2012 | | |
| JP | 5638507 B2 | 12/2014 | | |
| JP | 5805138 B2 | 11/2015 | | |
| JP | 5958109 B2 | 7/2016 | | |
| JP | 2016-162643 A | 9/2016 | | |
| JP | 2016-207412 A | 12/2016 | | |
| JP | 2018-20340 A | 2/2018 | | |
| JP | 2018-30155 A | 3/2018 | | |
| JP | 2018-51570 A | 4/2018 | | |
| JP | 2019-17223 A | 1/2019 | | |
| JP | 2019181506 A | * 10/2019 | ............. | B23K 26/21 |

* cited by examiner

METHOD FOR WELDING COPPER-INCLUDING MEMBERS, AND METHOD FOR MANUFACTURING ELECTRICAL ROTATING MACHINE

CROSS-REFERENCE TO RELATED APPLICATIONS

This application is based upon and claims the benefit of priority from the PCT Patent Application PCT/JP2019/006721, filed on Feb. 22, 2019; the entire contents of which are incorporated herein by reference.

FIELD

Embodiments of the invention relate to a method for welding copper-including members and a method for manufacturing an electrical rotating machine.

BACKGROUND

There are cases where copper-including members are laser-welded to each other. For example, a coil that is wound onto a stator is provided in an electrical rotating machine such as a motor, a generator, etc. The coil has poor flexibility because the coil is formed by winding a copper wire multiple times; and the manufacturability markedly degrades when inserting the formed coil into slots. Therefore, the coil that is wound onto the stator is formed by segmenting the coil into multiple members, inserting the multiple members into the slots, and subsequently laser-welding end portions of the multiple members to each other.

Here, copper is a material that has a high thermal conductivity and a high melting point compared to aluminum, etc. When the thermal conductivity is high, welding is difficult because the heat of the weld zone easily escapes. Also, welding is more difficult when the melting point is high.

Furthermore, the absorptance of copper is low for a laser of a wavelength in the infrared region in which a high output is easy. Also, the absorptance for the laser changes due to the component ratios of the copper-including members, the properties of the irradiation position of the laser at the copper-including members, etc.

Therefore, when copper-including members are welded to each other by a laser, it has been difficult to stabilize the quality of the weld zone.

DETAILED DESCRIPTION

Figure 1:
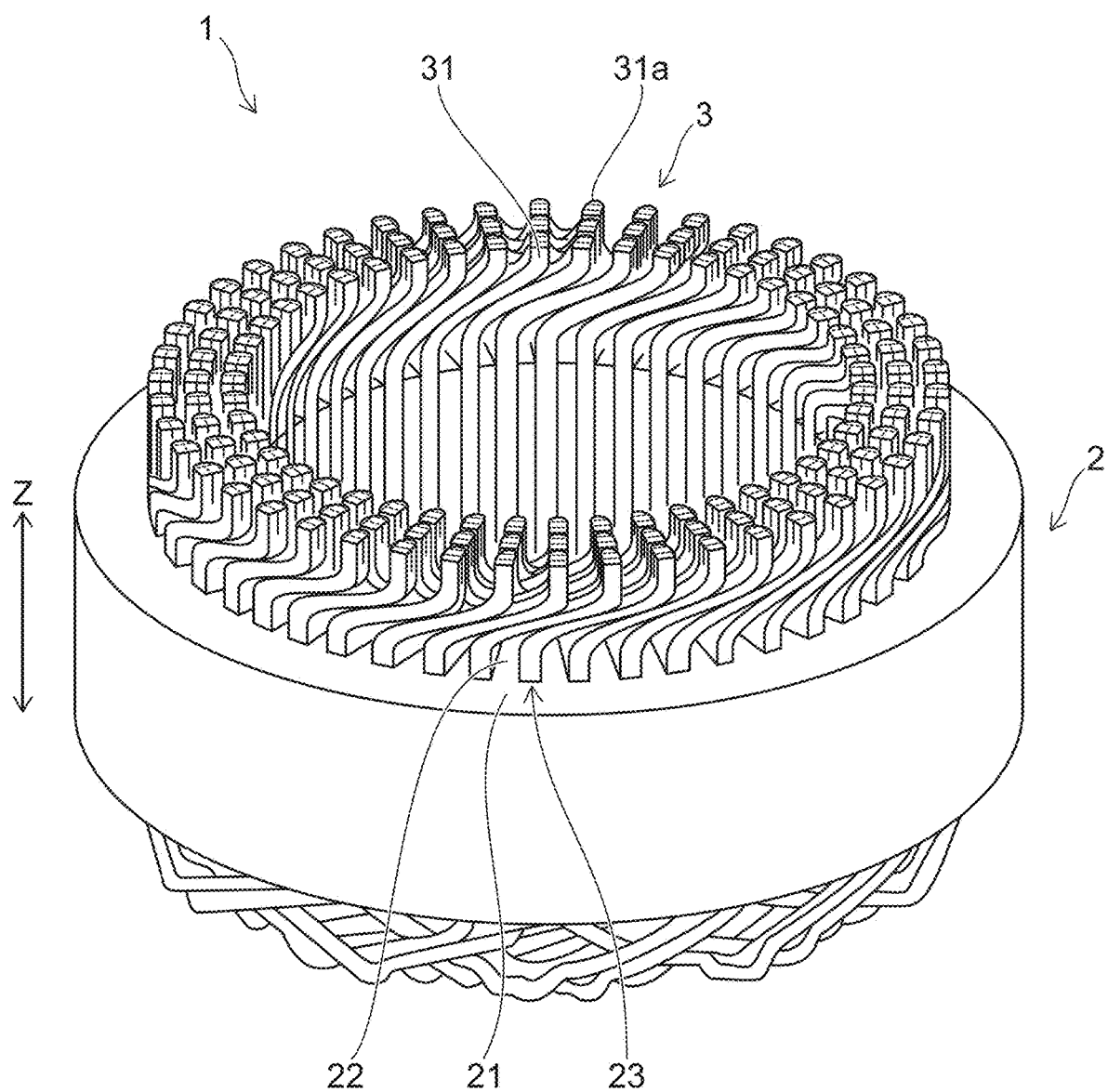
FIG. 1 is a schematic perspective view for illustrating a stator according to the embodiment.

A method for welding copper-including members according to an embodiment includes a process of laser-welding a first member that includes copper, and a second member that includes copper and is located adjacent to the first member. A welding surface of the first member and a welding surface of the second member are melted by moving an irradiation position of a laser to turn in a spiral shape while approaching a center of the spiral when irradiating the laser on the welding surface of the first member and the welding surface of the second member.

For example, the invention is applicable to butt-welding copper-including members to each other with a laser. The configurations of the copper-including members are not particularly limited. For example, the configurations of the copper-including members can be plate-shaped, rod-shaped, wire-shaped, etc.

For example, a coil that is provided in an electrical rotating machine such as a motor, a generator, etc., can be illustrated as copper-including members that are butt-welded to each other by a laser. Therefore, as an example hereinbelow, a method for manufacturing a stator is illustrated, and a method for welding copper-including members is described. Although a method for manufacturing a stator is illustrated, the invention also is applicable to a method for manufacturing a rotor. In other words, the invention is applicable to a method for manufacturing an electrical rotating machine.

Embodiments will now be illustrated with reference to the drawings. Similar components in the drawings are marked with the same reference numerals; and a detailed description is omitted as appropriate.

FIG. 1 is a schematic perspective view for illustrating a stator 1 according to the embodiment. As shown in FIG. 1, a stator core 2 and a coil 3 are provided in the stator 1.

In the stator core 2, multiple ring-shaped magnetic members can be stacked in the axis direction of the stator 1 (in FIG. 1, a Z-direction). For example, the magnetic member can be formed from an electrical steel sheet (a silicon steel sheet). The stator core 2 includes a yoke 21 and multiple teeth 22. The yoke 21 is tubular and is positioned at the outer perimeter side of the stator core 2. The multiple teeth 22 are located at the inner perimeter surface of the yoke 21 at uniform spacing. Each of the multiple teeth 22 has a configuration that protrudes from the inner perimeter surface of the yoke 21 toward the center of the stator core 2 and extends in the axis direction of the stator 1. Also, a groove that is located between the tooth 22 and the tooth 22 is used as a slot 23. The shapes, numbers, and sizes of the teeth 22 are not limited to those illustrated and can be modified as appropriate according to the application, size, specification, etc., of the electrical rotating machine in which the stator 1 is provided.

The coil 3 includes multiple segment conductors 31. The exterior shape of the segment conductor 31 can be substantially U-shaped. The segment conductor 31 is mounted inside the slot 23. The end portions of the segment conductor 31 protrude from one end surface of the stator core 2. The segment conductor 31 can be formed from a rectangular wire that has a rectangular cross section.

An end portion of one segment conductor 31 (corresponding to an example of a first segment conductor) and an end portion of a segment conductor 31 (corresponding to an example of a second segment conductor) that corresponds to the one segment conductor 31 are welded. In the case illustrated in FIG. 1, the end portion of one segment conductor 31 and the end portion of the segment conductor 31 adjacent in the diametrical direction of the stator core 2 are welded. Therefore, for example, the one segment conductor 31 is electrically connected with the end portion of the segment conductor 31 adjacent in the diametrical direction of the stator core 2 via a weld zone 31a. One coil 3 is formed by connecting the multiple segment conductors 31 in series. In such a case, the multiple coils 3 can encircle the inner side of the stator core 2 multiple laps. For example, as illustrated in FIG. 1, the three coils 3 of a U-phase, a V-phase, and a W-phase can have three laps around the inner side of the stator core 2. The exterior shapes, numbers, sizes, numbers of laps, etc., of the coil 3 and the segment conductor 31 are not limited to those illustrated and can be modified as appropriate according to the application, size, specification, etc., of the electrical rotating machine in which the stator 1 is provided.

The segment conductor 31 can be formed from a material that has high electrical conductivity. The segment conductor 31 can include copper. In other words, according to the embodiment, the segment conductors 31 are "copper-including members". For example, the segment conductor 31 can be formed from so-called pure copper or a material that has copper as a major component.

A method for manufacturing the stator according to the embodiment will now be described.

First, the stator core 2 is formed. For example, multiple plate-shaped magnetic members that include portions used to form the yoke 21 and the multiple teeth 22 are formed. For example, the magnetic member can be formed by patterning by stamping an electrical steel sheet having a thickness of about 0.05 mm to 1.0 mm. Then, the multiple magnetic members are stacked, and the stator core 2 is formed by, for example, welding or caulking the multiple magnetic members. The stator core 2 also can be formed by press forming a magnetic material powder and a resin binder.

Then, the coil 3 is formed.

First, the multiple segment conductors 31 that are used as components of the coil 3 are formed.

Figure 2:
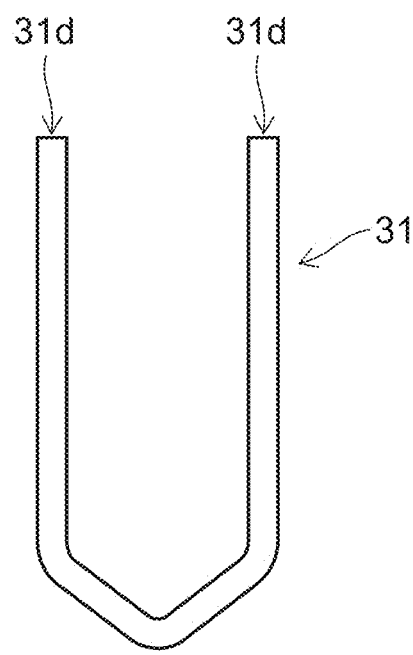
FIG. 2 is a schematic view for illustrating a segment conductor before mounting in a stator core.

FIG. 2 is a schematic view for illustrating the segment conductor 31 before mounting in the stator core 2.

As shown in FIG. 2, for example, the segment conductor 31 can be formed by bending a rectangular wire having a rectangular cross section. For example, the segment conductor 31 can be formed by bending the rectangular wire into a substantially U-shape. The cross-sectional dimension of the rectangular wire can be, for example, about 3 mm to 4 mm. The rectangular wire also can be, for example, a so-called pure copper wire, and can be a wire that includes copper as a major component.

Then, each of the multiple segment conductors 31 is mounted in prescribed slots 23 of the stator core 2. For example, each of the multiple segment conductors 31 is inserted into the prescribed slots 23 from the axis direction of the stator core 2 (the Z-direction in FIG. 1). In such a case, one segment conductor 31 is inserted to straddle multiple slots 23. The coil 3 according to the embodiment can be a coil that has so-called distributed winding. Also, the coil 3 according to the embodiment can be a coil that has so-called wave winding.

Then, the end portions of the multiple segment conductors 31 are bent; and end surfaces 31d of adjacent segment conductors 31 are welded to each other.

Figure 3:
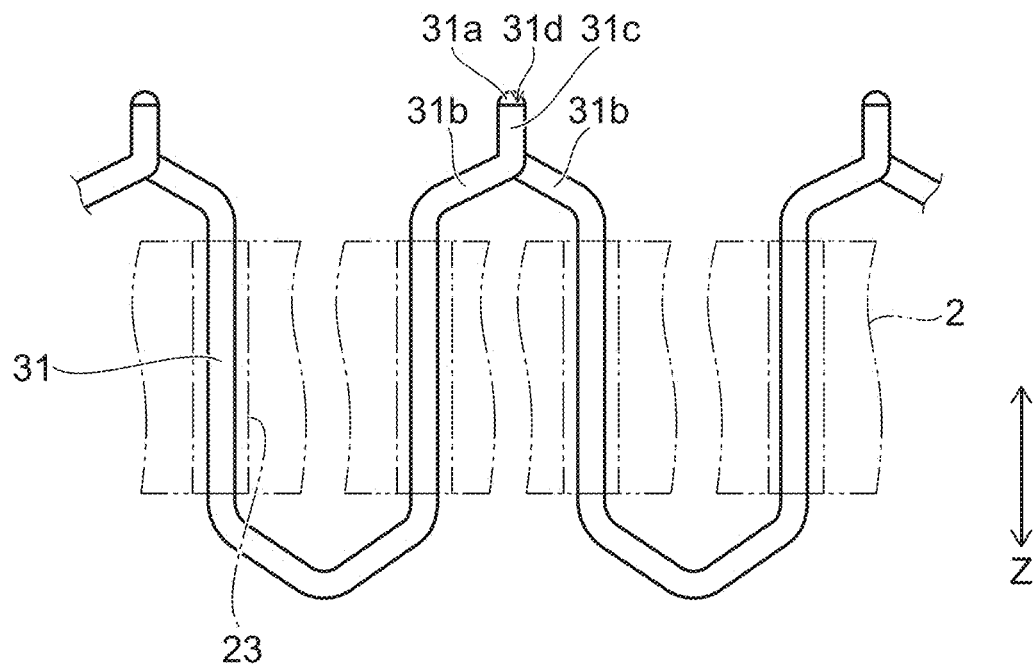
FIG. 3 is a schematic view for illustrating bending of end portions of segment conductors and welding of the end surfaces of the segment conductors.

FIG. 3 is a schematic view for illustrating the bending of the end portion of the segment conductor 31 and the welding of the end surface 31d of the segment conductor 31.

As shown in FIG. 3, an end portion 31b of the segment conductor 31 is bent in a direction approaching the adjacent segment conductor 31. Then, furthermore, a tip portion 31c of the segment conductor 31 is bent in the axis direction of the stator core 2 (the Z-direction in FIG. 1 and in FIG. 3). The tip portion 31c of the segment conductor 31 can be positioned to overlap the tip portion 31c of the adjacent segment conductor 31 in the diametrical direction of the stator core 2. Also, when the outer surface of the segment conductor 31 is covered with an insulating body, the insulating body that covers the tip portion 31c and the end surface 31d of the segment conductor 31 can be detached.

Multiple sets of bending such as that described above can be performed by shifting each set one slot 23. For example, when the three coils 3 of the U-phase, the V-phase, and the W-phase are formed, the bending of the three sets can be performed by shifting the mounting slots 23 of each set one slot 23. To avoid complexity, one set of bending and welding is drawn in FIG. 3.

Also, although a case where the bending is performed after mounting the multiple segment conductors 31 in the slots 23 is illustrated, this is not limited thereto. For example, the bending of the multiple segment conductors 31 can be performed, and each of the multiple segment conductors 31 on which the bending is performed can be mounted in the prescribed slot 23. In such a case, the segment conductor 31 on which the bending is performed can be mounted outward from the inner side of the stator core 2.

Then, as shown in FIG. 3, the end surfaces 31d of the adjacent segment conductors 31 are welded to each other. The welding can be performed by laser. For example, the welding can be performed by irradiating a laser having a wavelength in the infrared region on the end surfaces 31d of the segment conductors 31. By using a laser that has a wavelength in the infrared region, it is easy to irradiate a laser having a relatively high output. For example, the wavelength of the laser can be about 1040 nm to 1070 nm. For example, the output of the laser can be about 4 kW.

For example, the laser can be a fiber laser (Fiber laser), a disk laser (Disk laser), etc. Also, it is favorable for the laser welder to be a CW laser (Continuous wave laser) that can continuously emit the laser. Also, it is favorable for the laser welder to include, for example, a galvanomirror or the like that can scan the laser.

The weld zone 31a is formed by welding the end surfaces 31d of the adjacent segment conductors 31 to each other. Also, one coil 3 is formed by connecting the multiple segment conductors 31 in series. In such a case, the multiple coils 3 can be formed by shifting one slot 23 each. For example, the three coils 3 of the U-phase, the V-phase, and the W-phase can be formed by shifting one slot 23 each.

Details relating to the welding of the end surfaces 31d of the segment conductors 31 are described below.

Then, the coil 3 is fixed to the stator core 2. For example, varnish is dropped from the vertical direction of the coil 3; and the varnish is supplied to the interior of the slot 23. Continuing, the coil 3 is fixed to the stator core 2 by curing the varnish.

Thus, the stator 1 can be manufactured.

The welding of the end surfaces 31d of the segment conductors 31 will now be described further.

As described above, the segment conductor 31 includes copper. The thermal conductivity of copper is high compared to aluminum, etc. Therefore, the temperature of the end surface 31d is not easily increased even when the laser is irradiated on the end surface 31d of the segment conductor 31 because the heat that is generated is conducted through the segment conductor 31 and is dissipated.

Also, the melting point of copper is high compared to aluminum, etc. Therefore, it is difficult to melt the end surface 31d of the segment conductor 31 even when the laser is irradiated on the end surface 31d of the segment conductor 31.

In such a case, it is easy to melt the end surface 31d of the segment conductor 31 if the output of the laser is increased. To increase the output of the laser, it is sufficient to use a laser that has a wavelength in the infrared region. However, a laser that has a wavelength in the infrared region is not easily absorbed by the copper before melting. Also, the absorptance of the laser changes due to the component ratio of the materials of the segment conductor 31 and/or the properties (e.g., the surface roughness, etc.) of the end surface 31d. Therefore, it is difficult to stabilize the quality of the weld zone by simply irradiating a laser having a wavelength in the infrared region on the end surface 31d of the segment conductor 31.

Therefore, the method for manufacturing the stator according to the embodiment performs the welding as follows.

Figure 4:
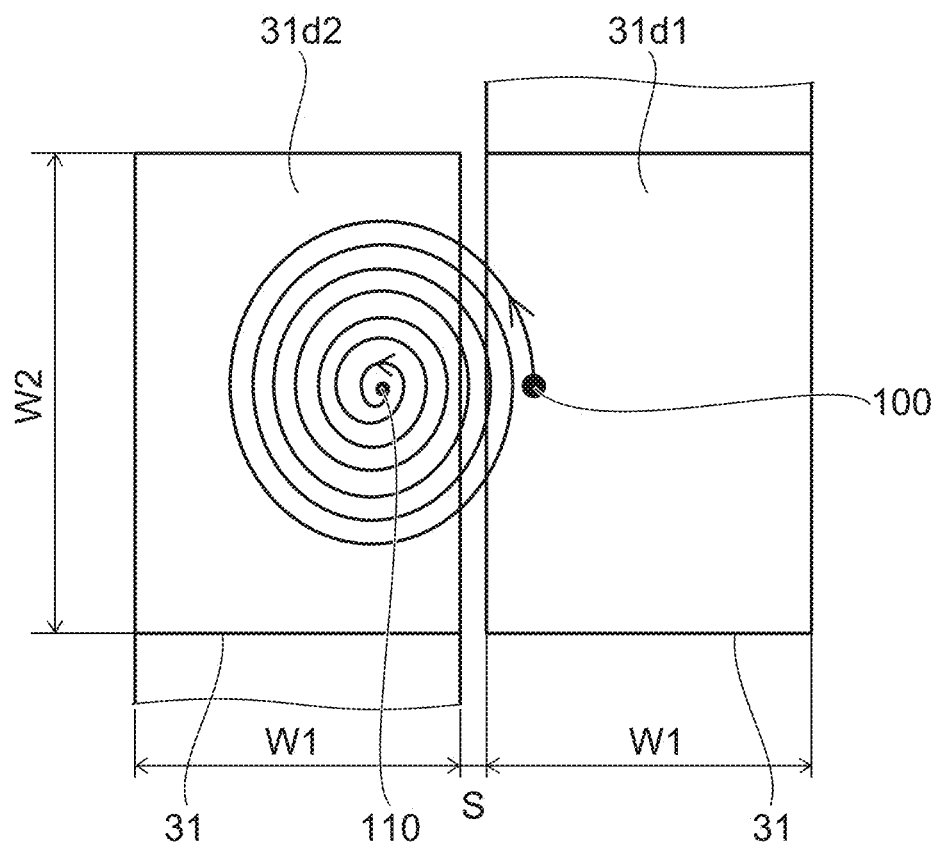
FIG. 4 is a schematic view for illustrating scanning of a laser.

FIG. 4 is a schematic view for illustrating the scanning of the laser.

As shown in FIG. 4, a gap may be located between an end surface 31d1 and an end surface 31d2 that is adjacent to the end surface 31d1. The end surface 31d1 and the end surface 31d2 that is adjacent to the end surface 31d1 may contact each other.

First, a laser is irradiated on the end surface 31d1. A start position 100 of the irradiation can be at the vicinity of the side of the end surface 31d1 at the end surface 31d2 side.

Then, the irradiation position of the laser is scanned so that the trajectory of the irradiation position has a spiral shape (a spiral shape). The shape of the spiral can be circular or elliptical. For example, the shape of the spiral can be circular when the shapes of the end surfaces 31d1 and 31d2 are squares or rectangles in which the difference between the long side and the short side is small. For example, when the shapes of the end surfaces 31d1 and 31d2 are rectangles in which the difference between the long side and the short side is large, the shape of the spiral can be an elliptical shape that has a major axis substantially parallel to the long sides of the end surfaces 31d1 and 31d2.

Also, the irradiation position of the laser can be moved inward from the outer side of the spiral. In other words, the end surfaces 31d1 and 31d2 are melted by irradiating the laser to turn in a spiral shape toward the inner sides of the end surfaces 31d1 and 31d2.

The heat that is generated by the irradiation of the laser is conducted radially with the irradiation position as the center. In such a case, if the irradiation position is moved inward from the outer side of the spiral, it is easy for more of the heat to be conducted to a center 110 of the spiral. Therefore, it is easy to increase the temperature of the irradiation region of the laser.

Also, the irradiation in the spiral shape can be performed continuously multiple times. There are cases where the temperature increase of the end surfaces 31d1 and 31d2 due to one irradiation of the spiral shape is insufficient. In such a case, it is sufficient to repeatedly perform the irradiation of the spiral shape. The number of repetitions of the irradiation in the spiral shape can be modified as appropriate according to the sizes of the end surfaces 31d1 and 31d2, etc. For example, the number of repetitions of the irradiation in the spiral shape can be appropriately determined by performing experiments and/or simulations.

Figure 5A:
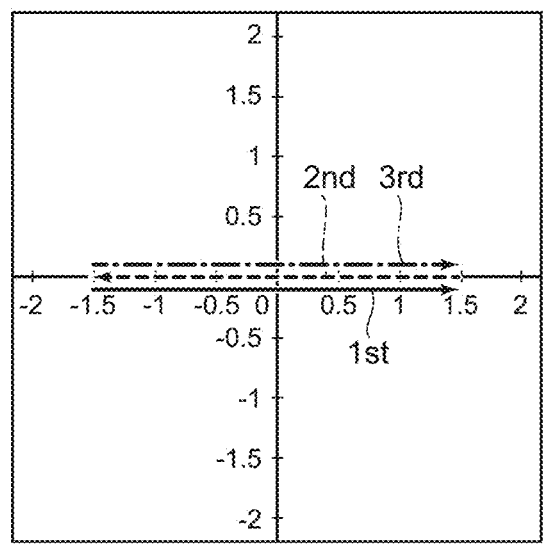
FIG. 5A is a schematic view for illustrating when the irradiation position of the laser is moved back and forth in a straight line.

FIG. 5A is a schematic view for illustrating when the irradiation position of the laser is moved back and forth in a straight line.

Figure 5B:
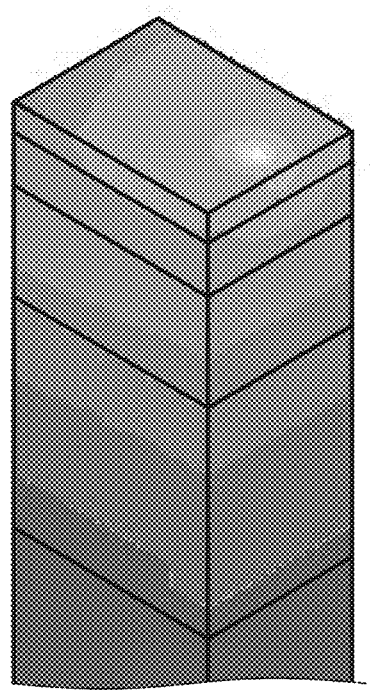
FIG. 5B is a schematic view for illustrating a temperature distribution of the irradiation surface when the irradiation shown in FIG. 5A is performed.

FIG. 5B is a schematic view for illustrating the temperature distribution of the irradiation surface when the irradiation shown in FIG. 5A is performed.

Figure 6A:
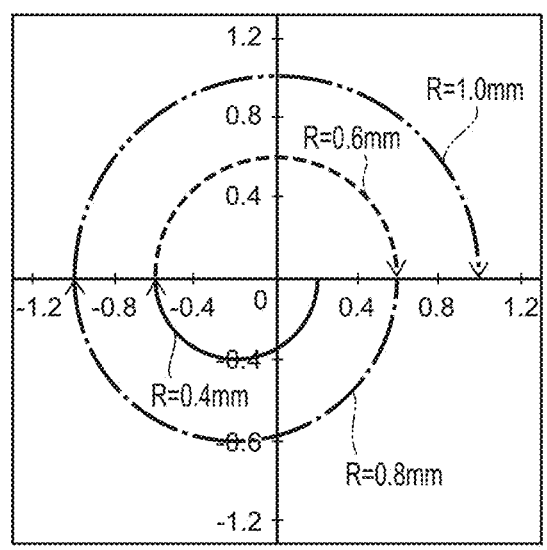
FIG. 6A is a schematic view for illustrating when the irradiation position of the laser is moved in a spiral shape outward from the inside.

FIG. 6A is a schematic view for illustrating when the irradiation position of the laser is moved in a spiral shape outward from the inside.

Figure 6B:
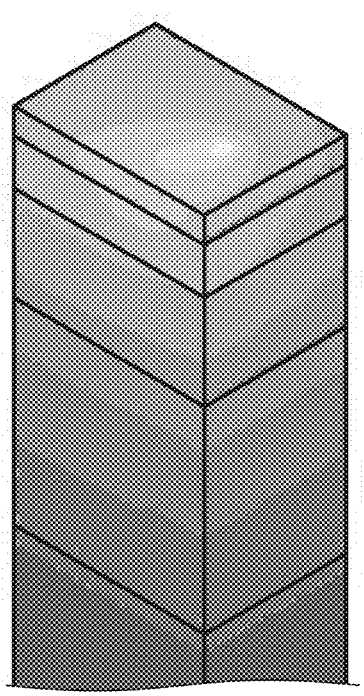
FIG. 6B is a schematic view for illustrating a temperature distribution of the irradiation surface when the irradiation shown in FIG. 6A is performed.

FIG. 6B is a schematic view for illustrating the temperature distribution of the irradiation surface when the irradiation shown in FIG. 6A is performed.

Figure 7A:
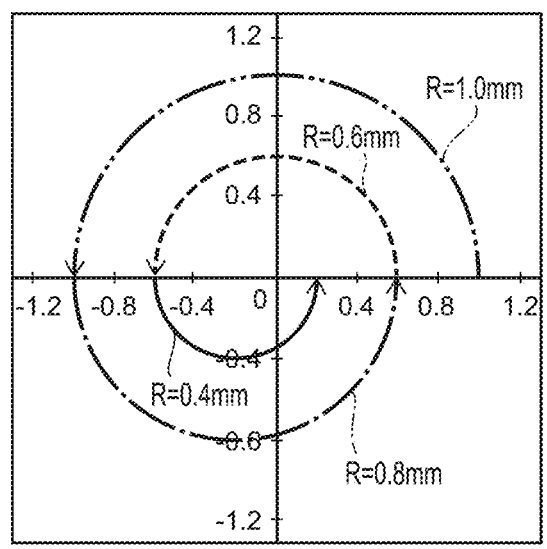
FIG. 7A is a schematic view for illustrating when the irradiation position of the laser is moved in a spiral shape inward from the outside.

FIG. 7A is a schematic view for illustrating when the irradiation position of the laser is moved in a spiral shape inward from the outside.

Figure 7B:
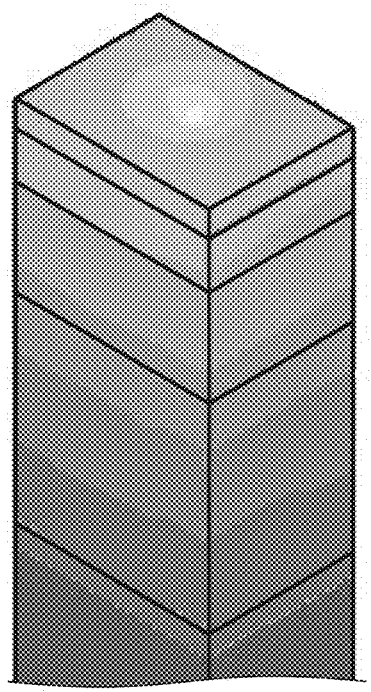
FIG. 7B is a schematic view for illustrating a temperature distribution of the irradiation surface when the irradiation shown in FIG. 7A is performed.

FIG. 7B is a schematic view for illustrating the temperature distribution of the irradiation surface when the irradiation shown in FIG. 7A is performed.

In FIG. 5B, FIG. 6B, and FIG. 7B, the temperature distribution is illustrated by monotone shading; and the display is lighter as the temperature increases and darker as the temperature decreases.

It can be seen from FIG. 5B that if the irradiation position is moved back and forth in a straight line, only a portion of the irradiation surface can be heated.

It can be seen from FIG. 6B that if the irradiation position is moved outward from the inner side of the spiral, a relatively wide area of the irradiation surface can be heated. However, a region in which the temperature is low is formed in a portion of the irradiation surface and below the portion.

Conversely, it can be seen from FIG. 7B that if the irradiation position is moved inward from the outer side of the spiral, the entire irradiation surface can be substantially uniformly heated. Also, the heating can be substantially uniform below the irradiation surface. In other words, if the irradiation position is moved inward from the outer side of the spiral, it is easy to increase the temperature of the irradiation region of the laser. Therefore, it is easy to melt the end surfaces 31d1 and 31d2 that include copper that has a high thermal conductivity and a high melting point. The absorptance for the laser of the copper after melting is greater than the absorptance for the laser of the copper before melting. Therefore, it is even easier to melt the end surfaces 31d1 and 31d2 when the melting of the end surfaces 31d1 and 31d2 has started.

Figure 8:
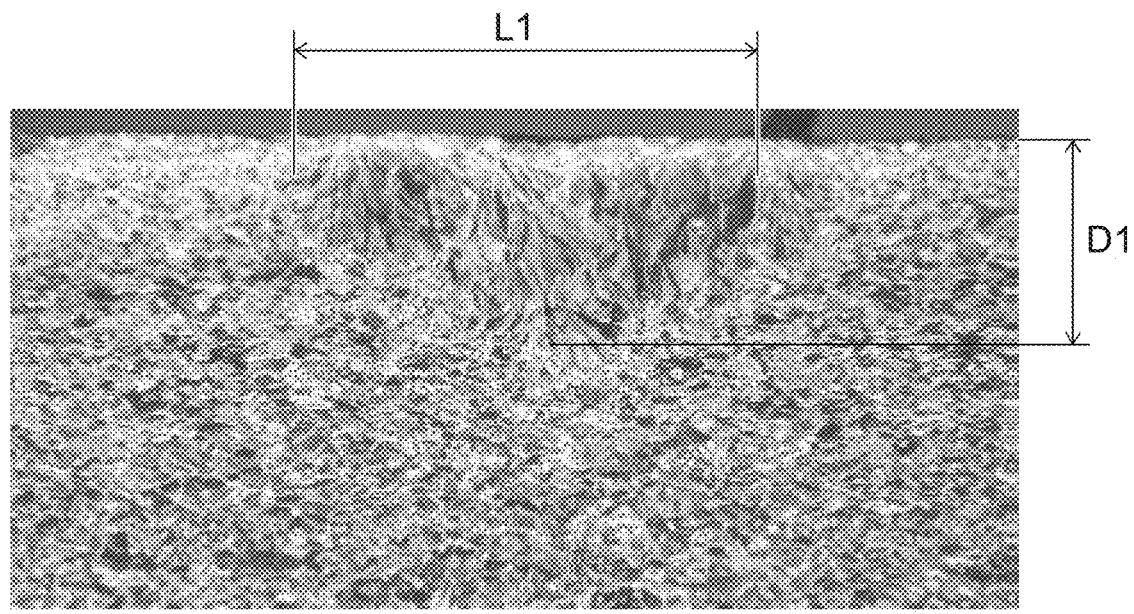
FIG. 8 is a cross-sectional photograph of a weld zone according to a comparative example.

FIG. 8 is a cross-sectional photograph of a weld zone according to a comparative example. FIG. 8 is a cross-sectional photograph of the weld zone when the irradiation position of the laser is moved in a spiral shape outward from the inside. In other words, this is a cross-sectional photograph of the weld zone of FIGS. 6A and 6B.

Figure 9:
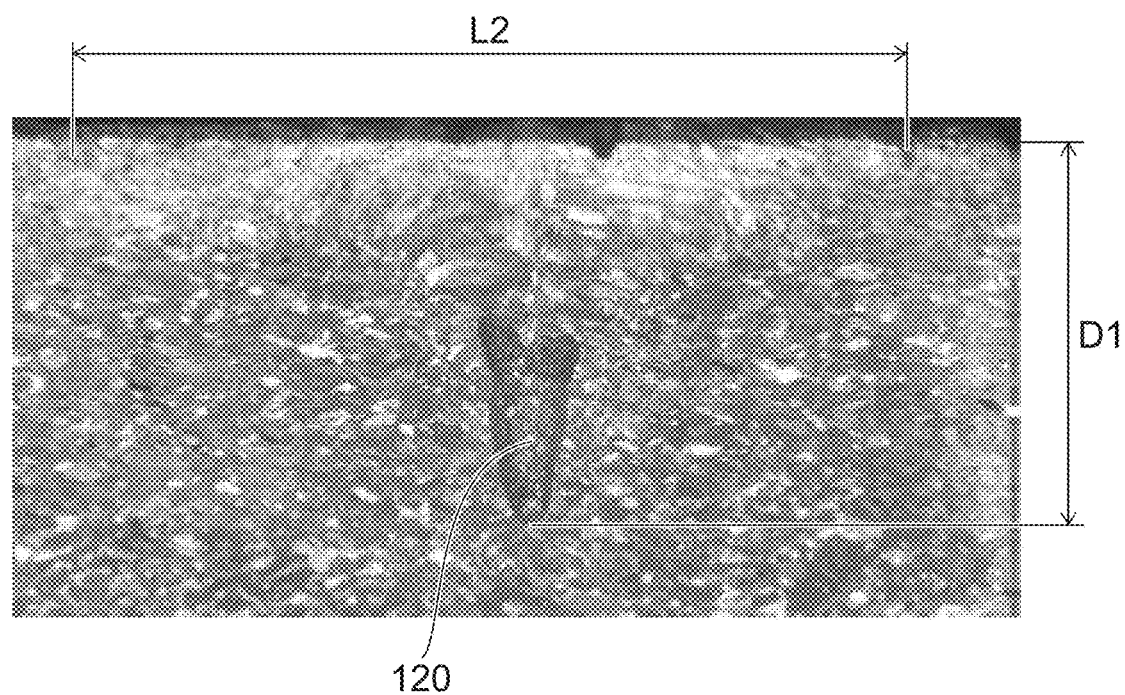
FIG. 9 is a cross-sectional photograph of a weld zone when the irradiation position of the laser is moved in a spiral shape inward from the outside.

FIG. 9 is a cross-sectional photograph of a weld zone when the irradiation position of the laser is moved in a spiral shape inward from the outside. In other words, this is a cross-sectional photograph of the weld zone of FIGS. 7A and 7B.

As described above, the heat that is generated by the irradiated laser is conducted radially with the irradiation position as a center. Therefore, if the irradiation position is moved outward from the inner side of the spiral as shown in FIG. 6A, it is difficult to increase the temperature at the center 110 of the spiral. As a result, as shown in FIG. 8, it is difficult to increase a width L1 and a penetration depth D1 of the weld zone.

Conversely, if the irradiation position is moved inward from the outer side of the spiral as shown in FIG. 7B, it is easy to increase the temperature at the center 110 of the spiral. Therefore, as shown in FIG. 9, it is easy to increase a width L2 and a penetration depth D2 of the weld zone. As a result, the quality of the weld zone can be stabilized.

However, when the irradiation position is moved inward from the outer side of the spiral, and when the irradiation of the laser is stopped at the center 110 of the spiral, it was found that there are cases where a void 120 occurs at the center of the bottom portion of the weld zone as shown in FIG. 9.

Although the cause of the occurrence of the void 120 is not exactly clear, it is considered that an abrupt temperature drop occurs when the irradiation of the laser is stopped at the center 110 of the spiral; and metal vapor that is inside the weld pool is trapped inside the weld zone.

As a result of investigations by the inventors, knowledge was obtained that the occurrence of the void 120 can be suppressed by continuing to move the irradiation position of the laser in a spiral shape outward from the inside as-is without stopping the scanning of the laser at the center 110 of the spiral or the vicinity of the center 110. The reason that the occurrence of the void 120 can be suppressed is not exactly clear. In such a case, for example, the occurrence of the abrupt temperature drop can be suppressed if the scanning of the laser is not stopped at the center 110 of the spiral or the vicinity of the center 110 because the laser continues to be irradiated at the center 110 of the spiral or the vicinity of the center 110. It is considered therefore that metal vapor easily escapes to the outside, and the occurrence of the void 120 is suppressed.

Figure 10A:
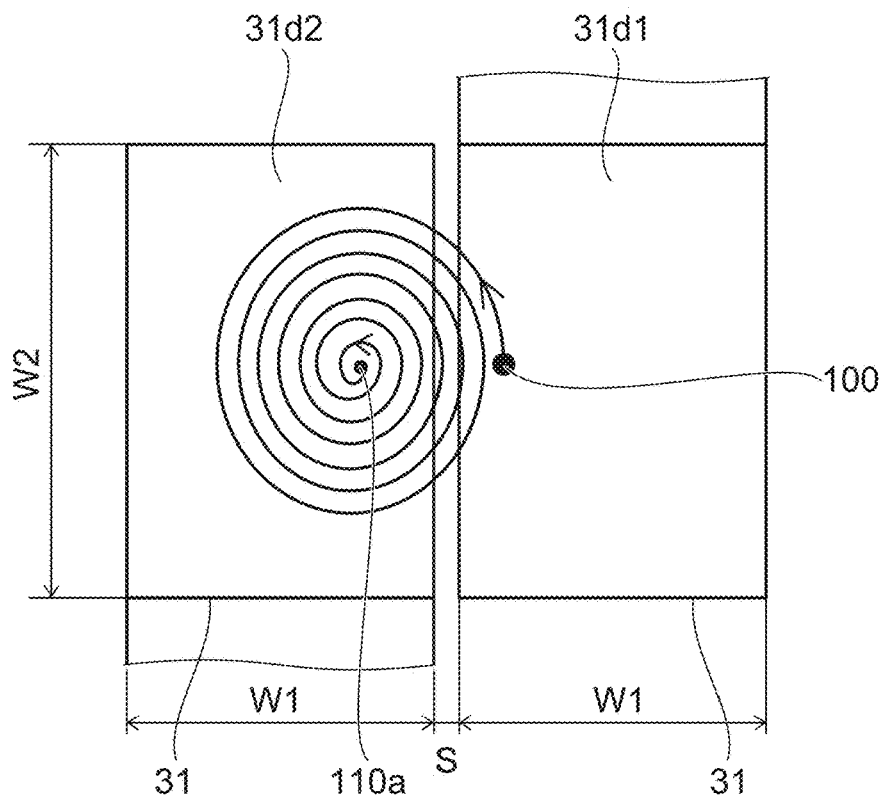
FIG. 10A is a schematic view for illustrating when the irradiation position of the laser is moved in a spiral shape inward from the outside.

FIG. 10A is a schematic view for illustrating when the irradiation position of the laser is moved in a spiral shape inward from the outside.

Figure 10B:
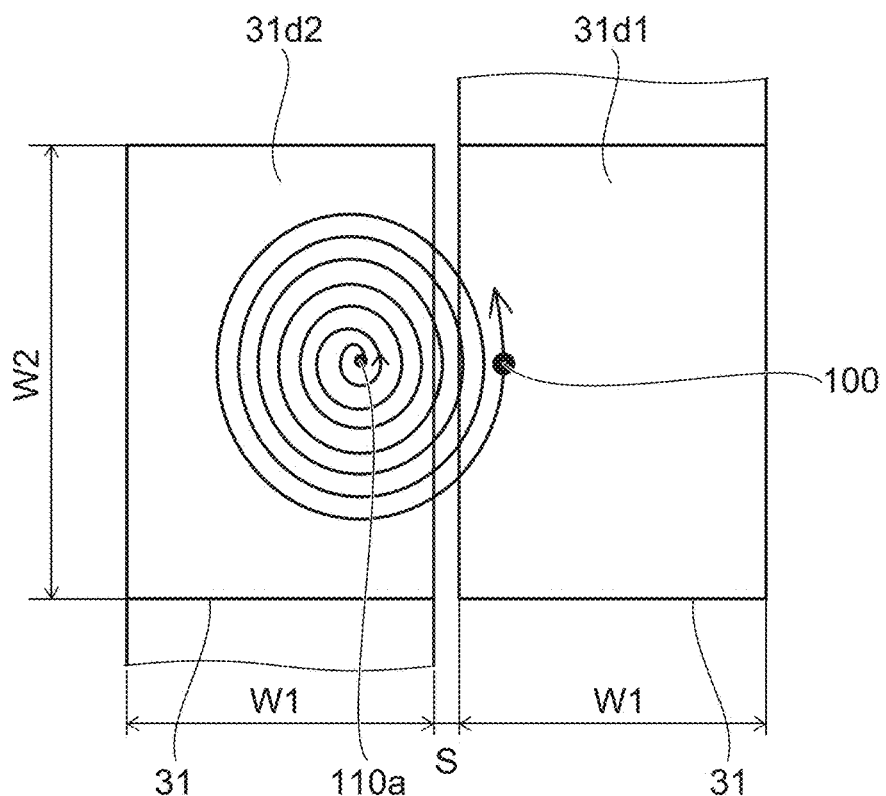
FIG. 10B is when the irradiation position of the laser is moved in a spiral shape outward from the inside by continuing as-is without stopping the scanning of the laser at the center of the spiral.

FIG. 10B is when the irradiation position of the laser continues to be moved in a spiral shape outward from the inside as-is without stopping the scanning of the laser at a center 110a of the spiral. In other words, the scanning illustrated in FIG. 10B is performed to continue without interruption from the scanning illustrated in FIG. 10A.

Although illustration in one drawing also is possible because the scanning illustrated in FIG. 10A and the scanning illustrated in FIG. 10B are performed by continuing without interruption, the illustration is divided into two drawings due to the complexity.

Also, although a case is illustrated in FIG. 10B where the irradiation is performed beyond start position 100 of the irradiation, the irradiation may end at or before reaching the start position 100 of the irradiation. Also, the vicinity of the start position 100 of the irradiation may be passed through without passing through the start position 100 of the irradiation. In such a case, by performing the irradiation beyond the start position 100 of the irradiation, the heat retention of the weld pool can be realized. The end position of the irradiation can be modified as appropriate according to the sizes of the end surfaces 31d1 and 31d2, etc. For example, the end position of the irradiation can be appropriately determined by performing experiments and/or simulations.

Also, similarly to those described above, the continuous irradiation illustrated in FIGS. 10A and 10B can be continued to be performed multiple times. The number of repetitions of the irradiation can be modified as appropriate according to the sizes of the end surfaces 31d1 and 31d2, etc. For example, the number of repetitions of the irradiation can be appropriately determined by performing experiments and/or simulations.

Figure 11:
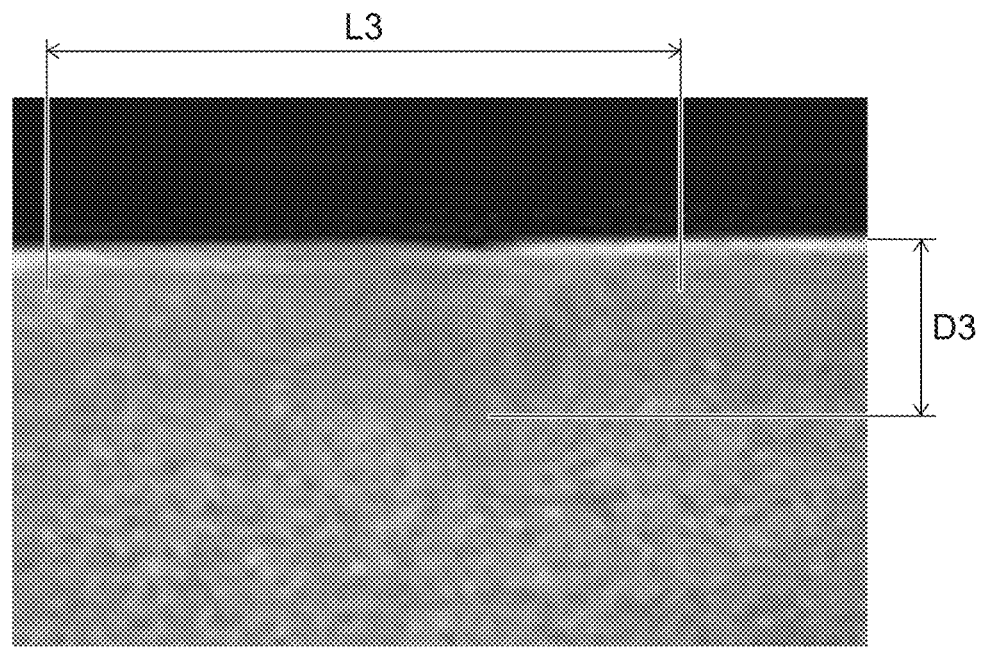
FIG. 11 is a cross-sectional photograph of a weld zone when the scanning of the laser illustrated in FIGS. 10A and 10B is performed.

FIG. 11 is a cross-sectional photograph of a weld zone when the scanning of the laser illustrated in FIGS. 10A and 10B is performed.

It can be seen from FIG. 11 that if the scanning of the laser illustrated in FIGS. 10A and 10B is performed, a width L3 and a penetration depth D3 of the weld zone can be increased similarly to the weld zone shown in FIG. 9. Also, the occurrence of the void 120 at the center of the bottom portion of the weld zone can be suppressed. In other words, the quality of the weld zone can be further stabilized.

As described above, by performing the irradiation of the laser according to the embodiment, the welding can be easy even for the segment conductor 31 that includes copper that is difficult to weld by a laser, and it is even easy to stabilize the quality of the weld zone 31a.

Also, as shown in FIG. 4, FIG. 10A, and FIG. 10B, the length of the trajectory of the irradiation position of the end surface 31d2 can be set to be greater than the length of the trajectory of the irradiation position of the end surface 31d1. In other words, the heating region of the end surface 31d2 can be set to be wider than the heating region of the end surface 31d1. Therefore, the amount of the melted metal of the end surface 31d2 is greater than the amount of the melted metal of the end surface 31d1. In such a case, the penetration depth of the end surface 31d2 is deeper than the penetration depth of the end surface 31d1.

According to knowledge obtained by the inventors, it is favorable for the total length of the trajectory of the irradiation position of the end surface 31d2:the total length of the trajectory of the irradiation position of the end surface 31d1 to be 6:4 to 7:3. Thus, the quality of the weld zone can be improved.

Figure 12:
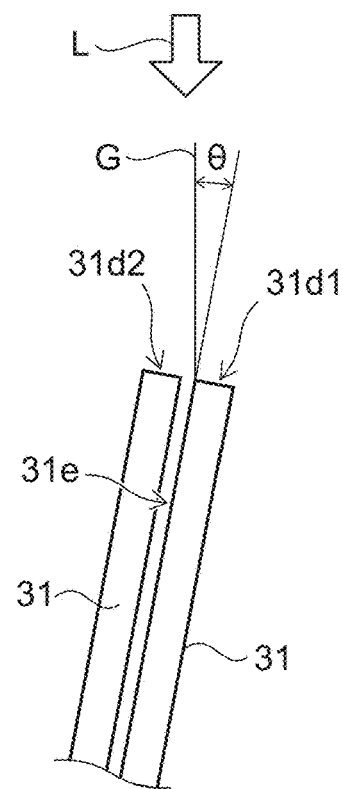
FIG. 12 is a schematic view for illustrating when the laser is irradiated in a state in which the segment conductors are inclined.

When a laser L is irradiated in a state in which the segment conductors 31 are inclined as shown in FIG. 12 described below, it is favorable for the end surface that has the longer total length of the trajectory of the irradiation position to be higher than the end surface that has the shorter total length of the trajectory of the irradiation position.

When the length of the trajectory of the irradiation position of the end surface 31d2 is greater than the length of the trajectory of the irradiation position of the end surface 31d1, the laser can be irradiated in a state in which the segment conductors 31 are inclined with respect to the direction of gravity (the vertical direction).

When the segment conductors 31 are inclined, the end surface 31d2 that has the longer length of the trajectory of the irradiation position (the wider heating region) can be positioned higher than the end surface 31d1 in the direction of gravity. Thus, melted metal can be supplied from the end surface 31d2 side where the amount of the melted metal is high toward the end surface 31d1 side. In such a case, there is melted metal at the surface of the end surface 31d1 because the end surface 31d1 also is heated. Therefore, the weld zone 31a is formed by the melted metals mixing with each other at the end surface 31d1. By the melted metals mixing with each other, the occurrence of an interface or the like can be suppressed; therefore, a reduction of the weld strength can be suppressed, and even the quality of the weld zone 31a can be stabilized.

FIG. 12 is a schematic view for illustrating when the laser L is irradiated in a state in which the segment conductors 31 are inclined.

As shown in FIG. 12, the angle between a gravity direction G and a side surface 31e of the segment conductor 31 is taken as θ. In such a case, when the angle θ is too large, there is a risk that the melted metal that is supplied from the end surface 31d2 side toward the end surface 31d1 side may be discharged from the end surface 31d1.

According to knowledge obtained by the inventors, it is easy for the melted metal to collect at the end surface 31d1 by setting the angle θ to be not more than 15°.

In such a case, as shown in FIG. 12, the laser L can be irradiated from the gravity direction G. Also, the laser L can be irradiated from the direction that is inclined with respect to the gravity direction G.

By performing the irradiation of the laser according to the embodiment, even for the segment conductor 31 that includes copper that is difficult to weld by a laser, the welding can be easy, and even the quality of the weld zone 31a is easy to stabilize.

Here, as described above, there are cases where a gap S is located between the end surface 31d1 and the end surface 31d2. When the laser is irradiated on the gap S, there are cases where the laser passes through the gap S and the laser is irradiated on a member located below the segment conductor 31. Therefore, there are cases where the member that is located below the segment conductor 31 may be damaged by the laser. As described above, the absorptance of copper for the laser is low; however, the likelihood of damage is increased when the member located below the segment conductor 31 includes a material that has a high absorptance for the laser.

Therefore, when the gap S is located between the end surface 31d1 and the end surface 31d2, it is favorable for the laser to be irradiated in a state in which the segment conductors 31 are inclined. By irradiating the laser in a state in which the segment conductors 31 are inclined, the laser that is irradiated on the gap S is easily incident on the side surface 31e of the segment conductor 31; therefore, the irradiation of the laser on the member located below the segment conductor 31 can be suppressed.

In such a case, it is sufficient for the angle θ between the gravity direction G and the side surface of the welding object (the side surface 31e of the segment conductor 31) to be an angle such that a portion of the welding object (the side surface 31e of the segment conductor 31) is visible in the gap when viewed along the irradiation direction of the laser.

Figure 13:
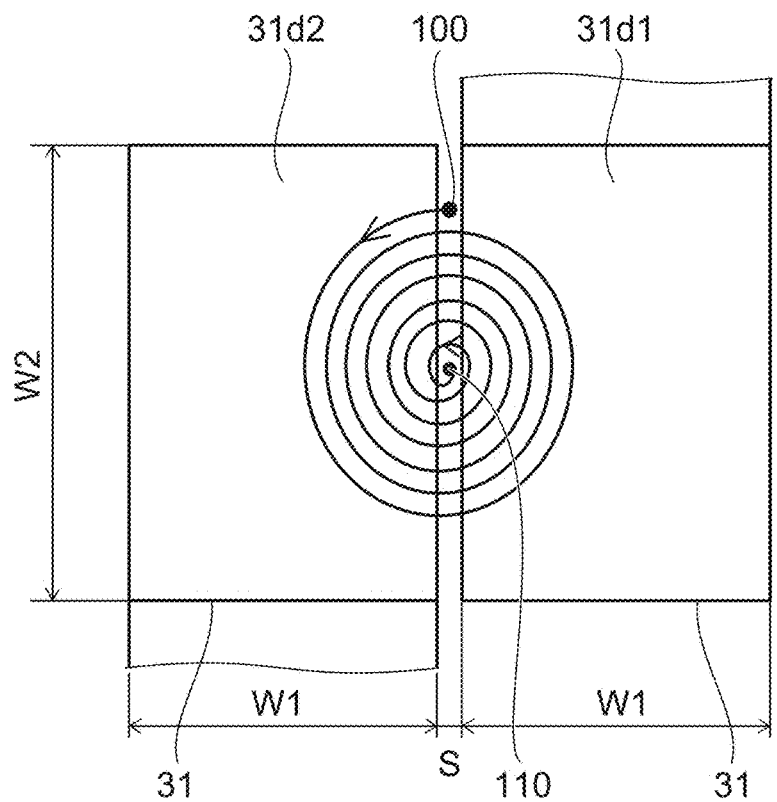
FIG. 13 is a schematic view for illustrating scanning of a laser according to another embodiment.
Figure 14:
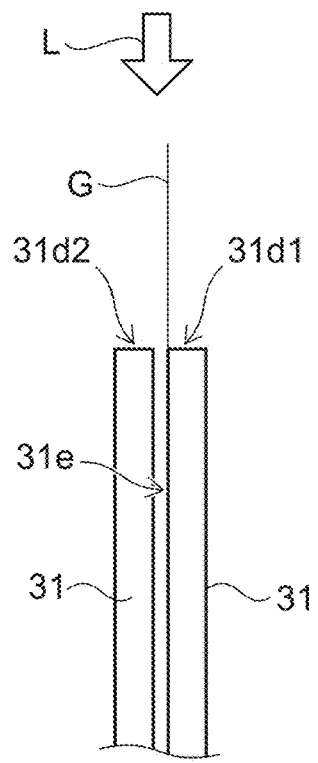
FIG. 14 is a schematic view for illustrating the arrangement of the segment conductors when irradiating the laser.

FIG. 13 is a schematic view for illustrating scanning of a laser according to another embodiment. FIG. 14 is a schematic view for illustrating the arrangement of the segment conductors 31 when irradiating the laser L.

As shown in FIG. 13, the start position 100 of the irradiation can be between the end surface 31d1 and the end surface 31d2. Also, the irradiation position of the laser is scanned so that the trajectory of the irradiation position has a spiral shape. The shape of the spiral can be similar to those described above. The irradiation position of the laser can be moved inward from the outer side of the spiral.

In such a case, the length of the trajectory of the irradiation position of the end surface 31d2 can be substantially equal to the length of the trajectory of the irradiation position of the end surface 31d1. In other words, the heating region of the end surface 31d2 can be substantially the same as the heating region of the end surface 31d1. Therefore, the amount of the melted metal of the end surface 31d2 is substantially equal to the amount of the melted metal of the end surface 31d1. The penetration depth of the end surface 31d2 is substantially equal to the penetration depth of the end surface 31d1.

When such scanning of the laser L is performed, the side surface 31e of the segment conductor 31 can be substantially parallel to the direction of gravity (the vertical direction) as shown in FIG. 14. For example, the angle θ described above can be substantially 0°. In other words, the angle θ described above can be set to "0°≤θ≤15°". In such a case, as shown in FIG. 14, the laser L can be irradiated from the gravity direction G. Also, the laser L can be irradiated from a direction that is inclined with respect to the gravity direction G.

As described above, when the gap S is located between the end surface 31d1 and the end surface 31d2, there is a risk that a member that is located below the segment conductor 31 may be damaged. Therefore, when the angle θ is 0° or small, it is favorable for the end surface 31d1 and the end surface 31d2 to contact, or for the gap S to be as small as possible.

By performing the irradiation of the laser according to the embodiment, even for the segment conductor 31 that includes copper that is difficult to weld with a laser, the welding can be easy, and it is even easy to stabilize the quality of the weld zone 31a.

Also, although a case where the end surface 31d1 and the end surface 31d2 are substantially coplanar (a case where there is no step between the end surface 31d1 and the end surface 31d2) is illustrated, one end surface may protrude further than the other end surface. In other words, there may be a step between the end surface 31*d*1 and the end surface 31*d*2. If, however, the step is too large, there is a risk that the movement of the melted metal may be suppressed. Therefore, it is favorable for the step to be not less than 0 mm and not more than 1 mm.

Also, according to knowledge obtained by the inventors, it was found that a sound that includes a unique frequency is generated when the end surface of the segment conductor 31 melts. Although the cause of the occurrence of the sound is not exactly clear, it can be considered to be as follows.

When the end surface of the segment conductor 31 melts and a so-called weld pool is formed, the melted metal that is inside the weld pool is further heated, and metal vapor is generated. When the metal vapor is generated, the melted metal that is at the periphery of the vapor is pushed aside, etc., and the melted metal vibrates. The sound is generated by the vibration being transmitted to the air.

There are cases where the frequency of the sound that is generated changes due to the component ratio of the materials of the segment conductor 31, the conditions of the laser welding, the temperature of the melted metal inside the weld pool, the depth of the weld pool, etc. For example, the frequency increases as the depth of the weld pool decreases. For example, when the depth of the weld pool is shallow, a sound that includes a frequency of about 1.5 kHz to 3 kHz is generated. When the depth of the weld pool is deep, a sound that includes a frequency that is not more than 1.5 kHz is generated.

The frequency of the sound that is generated and the relationship between the frequency and the depth of the weld pool (the penetration depth) can be known beforehand by, for example, performing experiments and/or simulations.

Therefore, for example, the start of the welding can be detected by detecting a sound that includes a predetermined frequency. The end of the welding can be determined using time management, the number of repetitions of the irradiation in the spiral shape, etc. The time from the start to the end of the welding and the number of repetitions of the irradiation in the spiral shape from the start to the end of the welding can be known beforehand by, for example, performing experiments and/or simulations.

Also, when the sound is not detected even when a prescribed period of time has elapsed after irradiating the laser, the laser welding can be suspended due to the occurrence of an abnormality.

Also, the depth of the weld pool, i.e., the penetration depth, can be known by detecting the change of the frequency.

A case is described above as an example in which the method for welding copper-including members according to the embodiment is applied to the method for manufacturing the stator 1.

In other words, the method for welding copper-including members according to the embodiment can include a process of laser-welding a first member (e.g., the segment conductor 31) that includes copper, and a second member (e.g., the segment conductor 31) that includes copper and is located adjacent to the first member. The welding surface (e.g., the end surface 31*d*1) of the first member and the welding surface (e.g., the end surface 31*d*2) of the second member can be melted by moving the irradiation position of the laser to turn in a spiral shape while approaching the centers 110 and 110*a* of the spiral when irradiating the laser on the welding surface of the first member and the welding surface of the second member.

In such a case, continuing from the movement of the irradiation position of the laser to turn in the spiral shape while approaching the center of the spiral, the irradiation position of the laser can be moved from the center of the spiral or the vicinity of the center of the spiral to turn in a spiral shape away from the center of the spiral.

In such a case, the first member and the second member can be inclined with respect to the direction of gravity when irradiating the laser.

Also, according to the method for welding copper-including members according to the embodiment, the first member and the second member can be inclined with respect to the direction of gravity when irradiating the laser; and the welding surface of the inclined first member and the welding surface of the inclined second member also can be melted by irradiating the laser in a spiral shape on the welding surface of the inclined first member and the welding surface of the inclined second member.

In such a case, when irradiating the laser in the spiral shape, the irradiation position of the laser can be moved to turn in the spiral shape while approaching the center of the spiral, and continuing, the irradiation position of the laser can be moved from the center of the spiral or the vicinity of the center of the spiral to turn in the spiral shape away from the center of the spiral.

It is favorable for the angle between the direction of gravity and the side surface of the first member to be not less than 0° and not more than 15°. It is favorable for the angle between the direction of gravity and the side surface of the second member to be not less than 0° and not more than 15°.

Also, the laser may be irradiated in the spiral shape multiple times.

Also, in the process of laser-welding, a sound that includes a prescribed frequency and is generated when at least one of the welding surface of the first member or the welding surface of the second member melts can be detected, and the start of the laser-welding can be detected based on the detected sound.

Also, according to the method for welding copper-including members according to the embodiment, when irradiating the laser on the welding surface of the first member and the welding surface of the second member, the welding surface of the first member and the welding surface of the second member can be melted by irradiating the laser in a spiral shape; a sound that includes a prescribed frequency and is generated when at least one of the welding surface of the first member or the welding surface of the second member melts can be detected; and the start of the laser-welding can be detected based on the detected sound.

When the method for welding copper-including members according to the embodiment is applied to the method for manufacturing the electrical rotating machine, the method for manufacturing the electrical rotating machine can include a process of mounting the coil that includes copper in multiple slots. The coil includes multiple segment conductors; and the end surfaces of the multiple segment conductors are welded by the method for welding copper-including members described above in the process of mounting the coil.

Also, the method for manufacturing the stator 1 according to the embodiment described above is a method for manufacturing the stator 1 that includes the stator core 2 including the multiple slots 23, and the coil 3 mounted in the multiple slots 23 and including the multiple segment conductors 31. In the process of welding the end surface of the first segment conductor and the end surface of the second segment conductor, the end surface of the first segment conductor and the end surface of the second segment conductor are melted by irradiating the laser on the end surface of the first segment conductor and the end surface of the second segment conductor to turn in a spiral shape approaching the center.

In such a case, the first segment conductor and the second segment conductor are inclined with respect to the direction of gravity when irradiating the laser.

Also, according to the method for manufacturing the stator 1 according to the embodiment, the first segment conductor and the second segment conductor are inclined with respect to the direction of gravity in the process of welding the end surface of the first segment conductor and the end surface of the second segment conductor. The end surface of the inclined first segment conductor and the end surface of the inclined second segment conductor also can be melted by irradiating the laser in a spiral shape on the end surface of the inclined first segment conductor and the end surface of the inclined second segment conductor.

The angle between the direction of gravity and the side surface of the first segment conductor can be set to be not more than 10°.

The angle between the direction of gravity and the side surface of the second segment conductor can be set to be not more than 10°.

The laser can be irradiated in a spiral shape multiple times.

A sound that includes a prescribed frequency and is generated when at least one of the end surface of the first segment conductor or the end surface of the second segment conductor melts can be detected; and the start of the welding can be detected based on the detected sound.

Also, according to the method for manufacturing the stator 1 according to the embodiment, the end surface of the first segment conductor and the end surface of the second segment conductor are melted by irradiating the laser on the end surface of the first segment conductor and the end surface of the second segment conductor in a spiral shape in the process of welding the end surface of the first segment conductor and the end surface of the second segment conductor. Also, the sound that includes a prescribed frequency and is generated when at least one of the end surface of the first segment conductor or the end surface of the second segment conductor melts is detected. Then, the start of the welding is detected based on the detected sound.

Example

Figure 15:
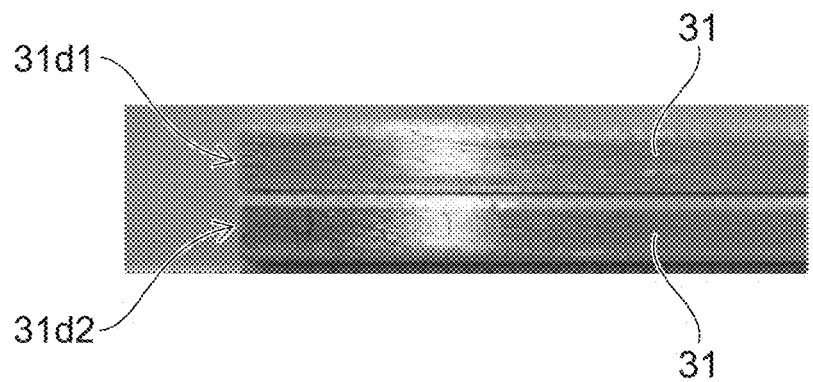
FIG. 15 is a photograph for illustrating end portions of the segment conductors before welding.
Figure 16A:
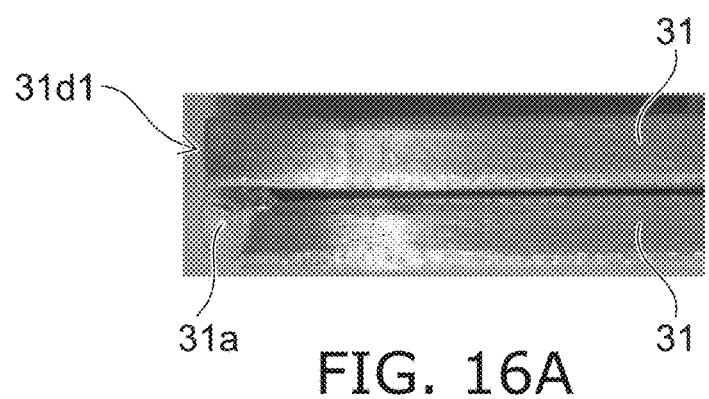
FIGS. 16A and 16B are when the scanning of the laser illustrated in FIG. 4 is performed.
Figure 16B:
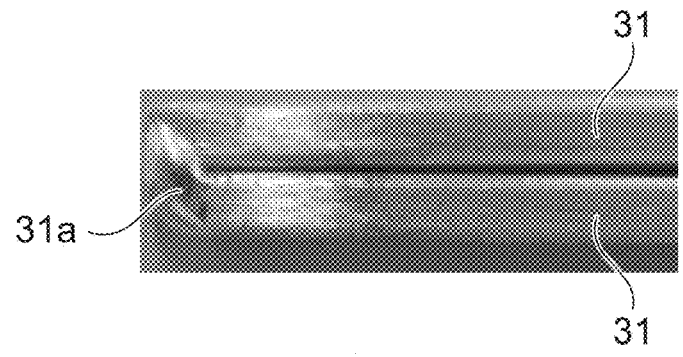

FIG. 15 is a photograph for illustrating the end portion of the segment conductor 31 before welding. FIGS. 16A and 16B are when the scanning of the laser illustrated in FIG. 4 was performed. In such a case, a width W1 of the end surfaces 31d1 and 31d2 illustrated in FIG. 4 was set to 3.0 mm; and a width W2 of the end surfaces 31d1 and 31d2 was set to 4.0 mm. Also, the gap S between the end surface 31d1 and the end surface 31d2 was set to 0.5 mm. The maximum radius of the spiral was set to 1.4 mm. The pitch of the spiral was set to 0.1 mm. The wavelength of the laser was set to 1040 nm to 1070 nm. The output of the laser was set to 2.9 kW. The angle θ between the gravity direction G and the side surface 31e of the segment conductor 31 was set to 10°. The time of one irradiation of the spiral shape is about 1 second.

Also, FIG. 16A is when the number of repetitions of the irradiation in the spiral shape was set to 3 times. It can be seen that the formation of the weld zone 31a is insufficient when the number of repetitions of the irradiation in the spiral shape is 3 times.

FIG. 16B is when the number of repetitions of the irradiation in the spiral shape was set to 4 times. It can be seen that the formation of the weld zone 31a is sufficient when the number of repetitions of the irradiation in the spiral shape is 4 times.

Figure 17A:
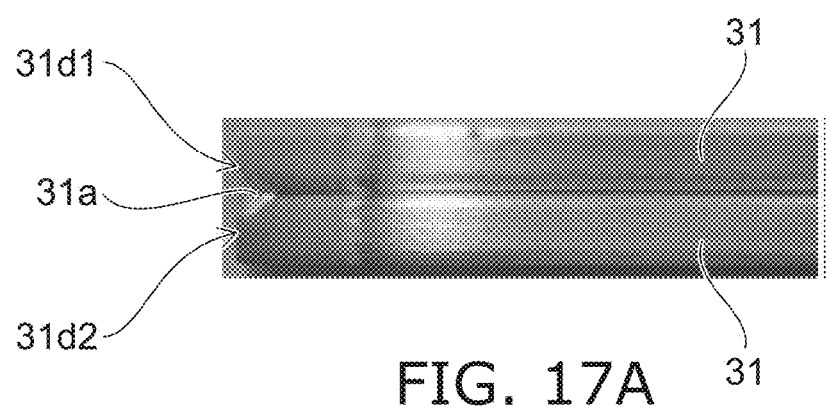
FIGS. 17A and 17B are when the scanning of the laser illustrated in FIG. 9 is performed.
Figure 17B:
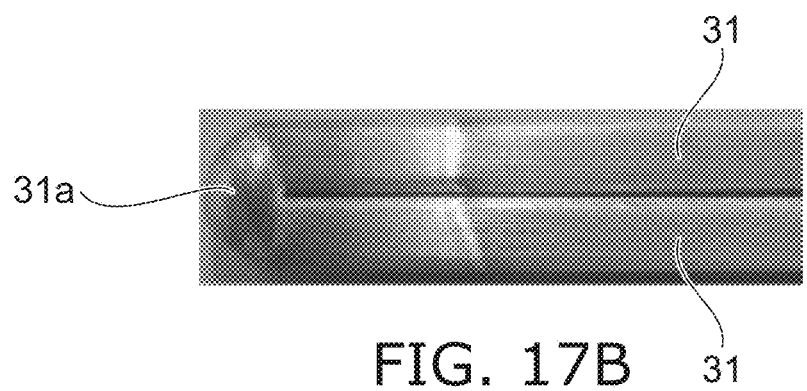

FIGS. 17A and 17B are when the scanning of the laser illustrated in FIG. 17 was performed.

In such a case, the width W1 of the end surfaces 31d1 and 31d2 illustrated in FIG. 17 was set to 3.0 mm; and the width W2 of the end surfaces 31d1 and 31d2 was set to 4.0 mm. Also, the gap S between the end surface 31d1 and the end surface 31d2 was set to 0 mm. In other words, the welding was performed in a state in which the end surface 31d1 and the end surface 31d2 were closely adhered. The maximum radius of the spiral was set to 1.4 mm. The pitch of the spiral was set to 0.1 mm. The wavelength of the laser was set to 1040 nm to 1070 nm. The output of the laser was set to 3.0 kW. The angle θ between the gravity direction G and the side surface 31e of the segment conductor 31 was set to 0°. The time of one irradiation of the spiral shape is about 1 second.

Also, FIG. 17A is when the number of repetitions of the irradiation in the spiral shape was set to 3 times. It can be seen that the formation of the weld zone 31a is insufficient when the number of repetitions of the irradiation in the spiral shape is 3 times.

FIG. 17B is when the number of repetitions of the irradiation in the spiral shape was set to 4 times. It can be seen that the formation of the weld zone 31a is sufficient when the number of repetitions of the irradiation in the spiral shape is 4 times.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Moreover, above-mentioned embodiments can be combined mutually and can be carried out.

What is claimed is:

1. A method for welding copper-including members, the method comprising:

laser-welding a first member and a second member, the first member including copper, the second member including copper and being located adjacent to the first member, the first member and the second member being inclined with respect to a direction of gravity, or the first member and the second member being substantially parallel to the direction of gravity, when irradiating a laser, a welding surface of the first member and a welding surface of the second member being aligned in a direction intersecting the laser irradiation direction, the welding surface of the first member and the welding surface of the second member being melted by moving an irradiation position of the laser to turn in a spiral shape while approaching a center of the spiral when irradiating the laser on the welding surface of the first member and the welding surface of the second member, the irradiation position of the laser being moved inward from an outer side of the spiral, and a start position of the laser irradiation being at the welding surface of the first member, on a side of the welding surface of the second member, and the center of the spiral being at the welding surface of the second member, or the start position of the laser irradiation being between the welding surface of the first member and the welding surface of the second member.

2. The method for welding copper-including members according to claim 1, wherein
the irradiation position of the laser is moved to turn in the spiral shape while approaching the center of the spiral, and then continues to be moved from the center of the spiral or a vicinity of the center of the spiral to turn in a spiral shape away from the center of the spiral.

3. The method for welding copper-including members according to claim 1, wherein
an angle between a direction of gravity and a side surface of the first member is not less than 0° and not more than 15°.

4. The method for welding copper-including members according to claim 1, wherein
an angle between a direction of gravity and a side surface of the second member is not less than 0° and not more than 15°.

5. The method for welding copper-including members according to claim 1, wherein
the laser is irradiated multiple times in the spiral shape.

6. The method for welding copper-including members according to claim 1, wherein
the laser welding includes:
detecting a sound generated when at least one of the welding surface of the first member or the welding surface of the second member melts, the sound including a prescribed frequency; and
detecting a start of the laser welding based on the detected sound.

7. The method for welding copper-including members according to claim 1, wherein
the start position of the laser irradiation is at the welding surface of the first member, on the side of the welding surface of the second member, and the center of the spiral is at the welding surface of the second member.

8. The method for welding copper-including members according to claim 1, wherein
the start position of the laser irradiation is between the welding surface of the first member and the welding surface of the second member.

9. A method for welding copper-including members, the method comprising:
laser-welding a first member and a second member, the first member including copper, the second member including copper and being located adjacent to the first member,
the first member and the second member being inclined with respect to a direction of gravity, or the first member and the second member being substantially parallel to the direction of gravity, when irradiating a laser, a welding surface of the first member and a welding surface of the second member being aligned in a direction intersecting the laser irradiation direction,
the welding surface of the inclined first member and the welding surface of the inclined second member being melted by irradiating the laser in a spiral shape on the welding surface of the inclined first member and the welding surface of the inclined second member, an irradiation position of the laser being moved inward from an outer side of the spiral, and
a start position of the laser irradiation being at the welding surface of the first member, on a side of the welding surface of the second member, and the center of the spiral being at the welding surface of the second member, or
the start position of the laser irradiation being between the welding surface of the first member and the welding surface of the second member.

10. The method for welding copper-including members according to claim 9, wherein
the irradiation position of the laser is moved to turn in the spiral shape while approaching a center of the spiral, and then continues to be moved from the center of the spiral or a vicinity of the center of the spiral to turn in a spiral shape away from the center of the spiral.

11. A method for welding copper-including members, the method comprising:
laser-welding a first member and a second member, the first member including copper, the second member including copper and being located adjacent to the first member, the first member and the second member being inclined with respect to a direction of gravity, or the first member and the second member being substantially parallel to the direction of gravity, when irradiating a laser, a welding surface of the first member and a welding surface of the second member being aligned in a direction intersecting the laser irradiation direction,
the welding surface of the first member and the welding surface of the second member being melted by irradiating the laser in a spiral shape when irradiating the laser on the welding surface of the first member and the welding surface of the second member, an irradiation position of the laser being moved inward from an outer side of the spiral,
a start position of the laser irradiation being at the welding surface of the first member, on a side of the welding surface of the second member, and the center of the spiral being at the welding surface of the second member, or
the start position of the laser irradiation being between the welding surface of the first member and the welding surface of the second member,
a sound that includes a prescribed frequency being detected,
the sound being generated when at least one of the welding surface of the first member or the welding surface of the second member melts, and
a start of the laser welding being detected based on the detected sound.

12. A method for manufacturing an electrical rotating machine, the method comprising:
mounting a coil in a plurality of slots,
the coil including copper,
the coil including a plurality of segment conductors, and
the mounting of the coil including welding end surfaces of the plurality of segment conductors using the method for welding copper-including members according to claim 1.

* * * * *